US008340001B2

(12) United States Patent
Song et al.

(10) Patent No.: US 8,340,001 B2
(45) Date of Patent: Dec. 25, 2012

(54) SYSTEM AND METHOD FOR SPATIAL DIVISION MULTIPLE ACCESS USING WIRELESS REPEATER HAVING SINGLE TRANSMITTING/RECEIVING ANTENNA

(75) Inventors: Young Seog Song, Daejeon (KR); Dong Seung Kwon, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 282 days.

(21) Appl. No.: 12/634,874

(22) Filed: Dec. 10, 2009

(65) Prior Publication Data
US 2010/0150034 A1  Jun. 17, 2010

(30) Foreign Application Priority Data

Dec. 11, 2008 (KR) .................. 10-2008-0126111
Nov. 13, 2009 (KR) .................. 10-2009-0109867

(51) Int. Cl.
*H04B 7/14* (2006.01)
(52) U.S. Cl. .................................. 370/279; 370/315
(58) Field of Classification Search .................. 370/279, 370/315, 334, 316, 252, 253
See application file for complete search history.

(56) References Cited

U.S. PATENT DOCUMENTS

| 8,009,578 B2* | 8/2011 | Kishigami et al. ............ 370/252 |
| 2006/0105709 A1* | 5/2006 | Oh et al. ....................... 455/13.1 |
| 2006/0270341 A1* | 11/2006 | Kim et al. ........................ 455/16 |
| 2007/0025349 A1* | 2/2007 | Bajic .............................. 370/389 |
| 2010/0110968 A1* | 5/2010 | Lee et al. ....................... 370/315 |
| 2010/0112937 A1* | 5/2010 | Choi et al. ........................ 455/9 |
| 2010/0208776 A1* | 8/2010 | Song et al. ..................... 375/211 |
| 2010/0222051 A1* | 9/2010 | Watanabe et al. .......... 455/422.1 |

FOREIGN PATENT DOCUMENTS

| KR | 10-2005-0120972 | 12/2005 |
| KR | 10-2008-0051999 | 6/2008 |
| KR | 10-2008-0070151 | 7/2008 |

* cited by examiner

*Primary Examiner* — Gary Mui
(74) *Attorney, Agent, or Firm* — Staas & Halsey LLP

(57) ABSTRACT

A system for spatial division multiple access using a wireless repeater having a single transmitting/receiving antenna, includes: a base station that selectively transmits a plurality of data stream signals to the wireless repeater within an area through a multi-transmitting antenna for downlink; and at least one wireless repeater that forms a wireless repeater group within the base station area and repeats the data stream signals selectively transmitted from the base station to terminals.

12 Claims, 4 Drawing Sheets

SYSTEM AND METHOD FOR SPATIAL DIVISION MULTIPLE ACCESS USING WIRELESS REPEATER HAVING SINGLE TRANSMITTING/RECEIVING ANTENNA

CROSS-REFERENCE TO RELATED APPLICATION

This application claims priority to and the benefit of Korean Patent Application Nos. 10-2008-0126111 and 10-2009-0109867 filed in the Korean Intellectual Property Office on Dec. 11, 2008, and Nov. 13, 2009, respectively, the entire contents of which are incorporated herein by reference.

BACKGROUND OF THE INVENTION (a) Field of the Invention

The present invention relates to a method for implementing spatial division multiple access in a system including a base station, a wireless repeater, and a terminal for mobile communication. In detail, the present invention relates to a signal processing method and a signal transmitting method of a base station that can provide spatial division multiple access in the system.

(b) Description of the Related Art

Among wireless transmission technologies, many technologies of increasing sector throughput using multiple antennas have been researched. Spatial division multiple access (SDMA) means a method that allows one base station to allocate the same resource to several terminals, and transmits and receives one or more data streams. At this time, in order to obtain an effect of increasing the sector throughput using the SDMA, a plurality of data streams should be simultaneously transmitted as maximally as possible, which can be achieved only when a received signal to noise ratio (SNR) of a plurality of terminals participating in multiple transmission is high. However, spatial multiplexing can be achieved only in an area near a base station having a high received signal to noise ratio of the terminals and is difficult to apply to terminals far away from the base station. In other words, there is a problem in that the spatial multiplexing can be applied only to some areas within cells.

A repeater mainly is used to remove shadow areas within the cells, or can be used to expand coverage. That is, when the repeater is installed in shadow areas, since the signal to noise ratio is increased, the shadow areas are removed, and when the repeater is installed in areas out of a cell radius of the base station, the coverage is expanded.

As the wireless repeater, a radio frequency (RF) repeater, which receives, amplifies, and repeats carriers transmitted from the base station into the cell as it is, has been mainly used. However, since the existing RF repeater does not perform signal processing for the repeater in the base station, there is a problem in that it is not used to increase the sector throughput.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a system and method for spatial division multiple access having advantages of achieving spatial division multiple access for terminals belonging to each repeater area by performing signal processing upon transmitting signals from multiple antenna base stations while using the existing wireless repeater as it is.

In order to solve the foregoing technical problems, an exemplary embodiment of the present invention provides a system for spatial division multiple access, including:

a base station that selectively transmits a plurality of data stream signals through multiple transmitting antennas for downlink; and at least one wireless repeater that have a transmitting antenna and a receiving antenna and forms a wireless repeater group within the base station area and repeats the data stream signals selectively transmitted from the base station to terminals.

The base station includes a channel collection unit that collects downlink channels between each wireless repeater and the multiple transmitting antennas of the base station, and a signal processor that performs the signal processing to selectively transmit each data stream corresponding to each wireless repeater based on the downlink channels that are collected upon simultaneously transmitting the plurality of data streams.

Another exemplary embodiment of the present invention provides a method for performing spatial division multiple access by allowing a base station to use a wireless repeater having a single transmitting/receiving antenna, including:

collecting downlink channels from at least one wireless repeater within the area of the base station; determining a repeating area included in terminals for the spatial division multiple access; and selectively transmitting a plurality of data stream signals to the wireless repeater through multiple transmitting antennas for downlink.

DETAILED DESCRIPTION OF THE EMBODIMENTS

Figure 1:
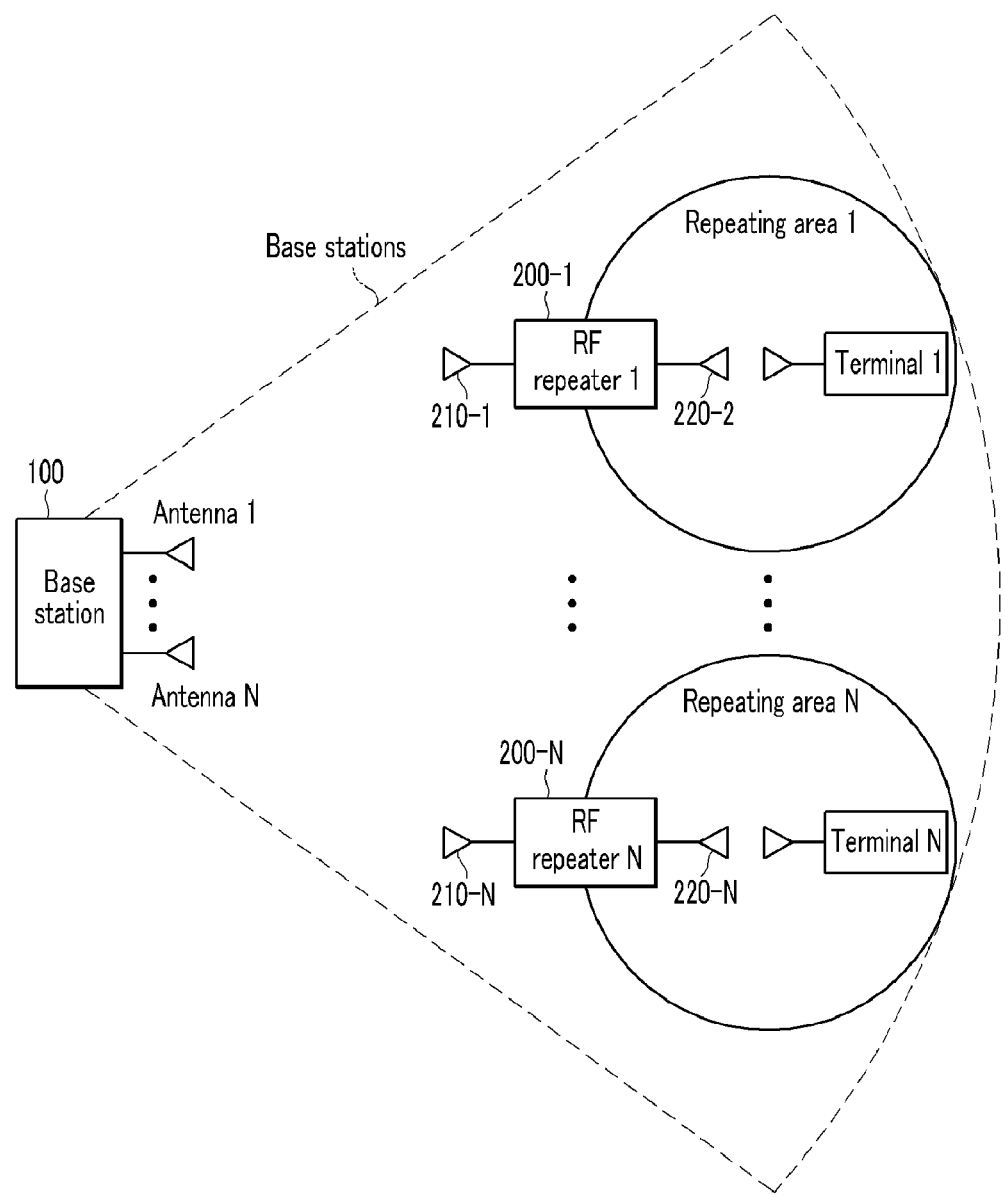
FIG. 1 is a network configuration diagram showing a system for spatial division multiple access according to an embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In the specification, unless explicitly described to the contrary, the word "comprise" and variations such as "comprises" or "comprising" will be understood to imply the inclusion of stated elements but not the exclusion of any other elements.

In this specification, a terminal may designate a mobile station (MS), a terminal, a mobile terminal (MT), a subscriber station (SS), a portable subscriber station (PSS), user equipment (UE), an access terminal (AT), etc., and may include functions of all or a part of the mobile terminal, the subscriber station, the portable subscriber substation, the user equipment, etc.

In this specification, a base station (BS) may designate an access point (AP), a radio access station (RAS), a node B, a base transceiver station (BTS), etc., and may include functions of all or a part of the access point, the radio access station, the node B, the base transceiver station, etc.

FIG. 1 is a network configuration diagram showing a system for spatial division multiple access according to an embodiment of the present invention.

Referring to FIG. 1, the system for spatial division multiple access according to the exemplary embodiment of the present invention includes a base station 100 having multiple antennas, a plurality of repeaters 200-1 to 200-N (200) that receive, amplify, and retransmit transmission signals from the base station 100, and a plurality of terminals 10-1 to 10-N (10) that belong to the repeater 200 area.

It is assumed that the repeater 200 includes one antenna for transmission/reception with the base station 100 and one antenna for transmission/reception with the terminal 10. Hereinafter, the antenna for transmission/reception with the base station 100 is referred to as a first antenna 210 and the antenna for transmission/reception with the terminal 10 is referred to as a second antenna 220.

Although the accompanying FIG. 1 shows, by way of example, a case where each repeating group (area) includes one repeater 200, the present invention is not limited thereto. Therefore, the present invention can be applied to a case where each repeater group includes a plurality of repeaters 200.

The base station 100 according to an exemplary embodiment of the present invention can transmit data streams corresponding to the number of antennas of the base station 100 in the case of downlink. In particular, at a transmitting end of the base station 100, a signal processing method is applied so that specific streams are selectively received in the specific repeater 200 and signals transmitted from other antenna are maximally suppressed or removed.

The repeater 200 amplifies the received signals and transmits them to the repeating area. At this time, the terminals 10 belonging to each repeater 200 selectively and strongly receive the specific stream signals of the base station 100, such that the spatial division multiple access can be achieved.

Meanwhile, the base station 100 according to the exemplary embodiment of the present invention acquires the repeating area information of the terminals 10, and can use this to select the terminals 10 for spatial division multiple access. In other words, the base station 100 uses the fact that the repeating area can be set to not be overlapped, based on the repeating area information, thereby making it possible to select the terminals 10 at each repeater 200 area one by one. Resources are appropriately allocated to the selected terminals 10, and data can be simultaneously transmitted.

Figure 2:
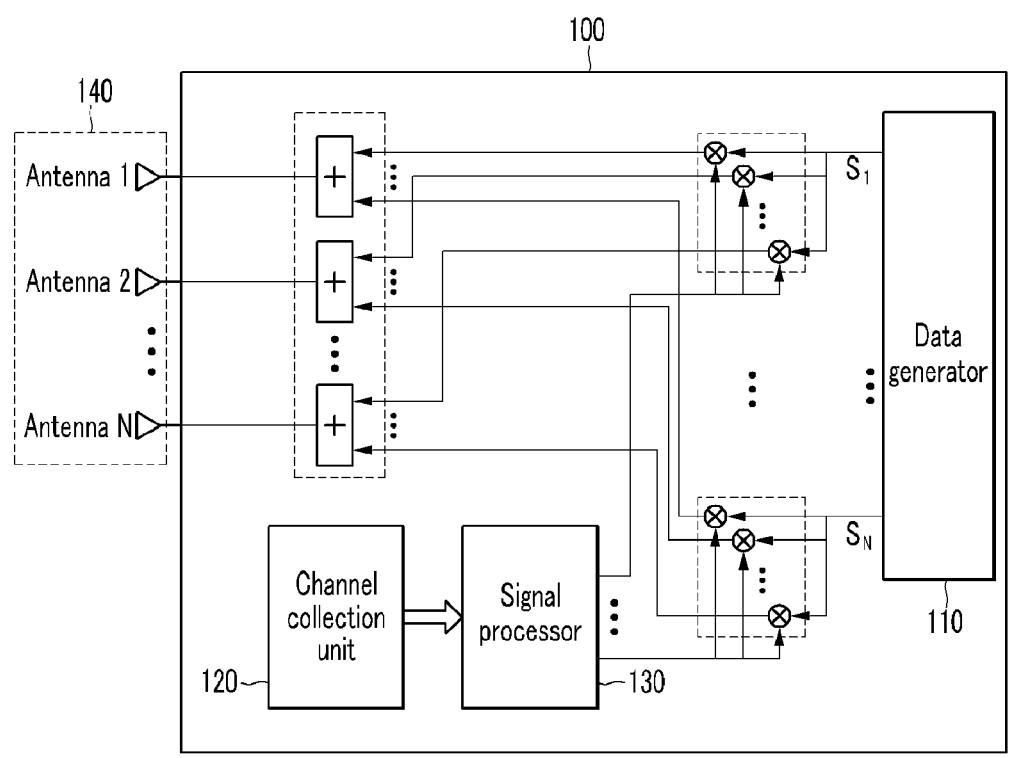
FIG. 2 is a configuration diagram schematically showing a base station according to an exemplary embodiment of the present invention.

FIG. 2 is a diagram schematically showing the base station according to the exemplary embodiment of the present invention.

Referring to FIG. 2, the base station 100 of the system for spatial division multiple access according to the exemplary embodiment of the present invention includes a data generator 110, a channel collection unit 120, a signal processor 130, and a plurality of base station antennas (multiple transmitting antennas) 140.

The data generator 110 generates a plurality of data streams $S_1, S_2, \ldots, S_N$ that are transmitted from a plurality of repeaters 200-1 to 200-N.

The channel collection unit 120 collects channel values between the plurality of base station antennas 140 and the plurality of repeaters 200. In other words, the base station 100 can collect and store downlink channel values that are periodically fed back from each repeater 200.

The channel values between the plurality of base station antennas 140 and the plurality of repeaters 200 collected from the repeater 200 can be obtained by the following Equation 1.

If it is assumed that the channels of M (<N) repeaters 200 and N base station antennas 140 channel are referred to as H, H becomes as follows.

$$H = \begin{bmatrix} h_{11} & h_{12} & \ldots & h_{1N} \\ h_{21} & h_{22} & \ldots & h_{2N} \\ \vdots & \vdots & \ldots & \vdots \\ h_{M1} & h_{M2} & \ldots & h_{MN} \end{bmatrix} \qquad \text{[Equation 1]}$$

Herein, $h_{ij}$ represents the channel value between the first antenna (herein it is used as a receiving antenna) 210 of the i-th repeater 200 and the j-th antenna 140 of the base station 100

Further, the base station 100 receives a file signal transmitted from the repeater 200 in the case of a time division duplex (hereinafter referred to as "TDD") system to estimate uplink channels, thereby making it possible to acquire the downlink channel values. In other words, channel reciprocity is established in the TDD system, such that the uplink channel value becomes the downlink channel value.

The signal processor 130 may be referred to as a precoding vector generator, and receives the downlink channel matrix H collected from the channel collection unit 120 to generate a precoding vector set (matrix) so that the specific repeater 200 can selectively receive the specific data stream of the base station 100. At this time, the signal processor 130 multiplies each precoding vector by the data streams of the base station 100, respectively. The vectors obtained by multiplying by each data stream are summed at a front end of the base station antenna 140, which is transmitted to the outside through the base station antenna 140.

Meanwhile, a method for allowing the base station 100 according to the exemplary embodiment of the present invention to selectively repeat the specific streams to the specific repeaters through the base station antenna 140 will be described through the following embodiments.

In the case of the downlink, the base station 100 can transmit the data streams corresponding to the number of base station antennas 140. At the transmitting end of the base station 100, the signal processing method is applied so that the specific streams are selectively received in the specific repeaters. Then, the terminals 10 belonging to each repeater 200 selectively and strongly receive the specific stream signals of the base station 100, such that the spatial division multiple access can be achieved.

First, the signal processing method at the transmitting end of the base station 100 according to the first exemplary embodiment of the present invention is as follows.

A matrix (T) when the base station 100 selectively repeats an n-th stream to an n-th repeater is obtained as the following Equation 2 by using a minimum mean square error (MMSE) method.

$$T = H^H(\sigma_w^2 I_M + HH^H)^{-1} \qquad \text{[Equation 2]}$$

Herein, H means the channel value between the N-th base station antenna 140 and the repeater 200 antenna, superscript H means one that applies complex conjugate and transpose for a matrix or vector, and $\sigma_w^2$ means the noise power of the repeater.

In addition, when selectively repeating the N-th antenna of the base station antennas 140 of the base station 100, the selection vector of the base antenna 140 according to a zero forcing (ZF) method can be obtained by Equation 3.

$$T = H^H (HH^H)^{-1} \qquad \text{[Equation 3]}$$

As described above, the signal processor 130 of the base station 100 calculates a precoding vector set (matrix) based on the downlink channel matrix (H) collected from the repeater 200, and multiplies the calculated precoding vector set by data streams generated from the data generator 110. The vectors obtained by multiplying by each data stream are summed at the front end of the base station antenna 140 and are transmitted to the outside through the base station antenna 140.

Meanwhile, the base station 100 of a system for spatial division multiple access according to a second exemplary embodiment of the present invention can perform the signal processing method to which Tomlison-Harashima precoding is applied. It is known that this exhibits good performance upon applying to a broadcast channel, so it is preferable to transmit the broadcast stream data.

Figure 3:
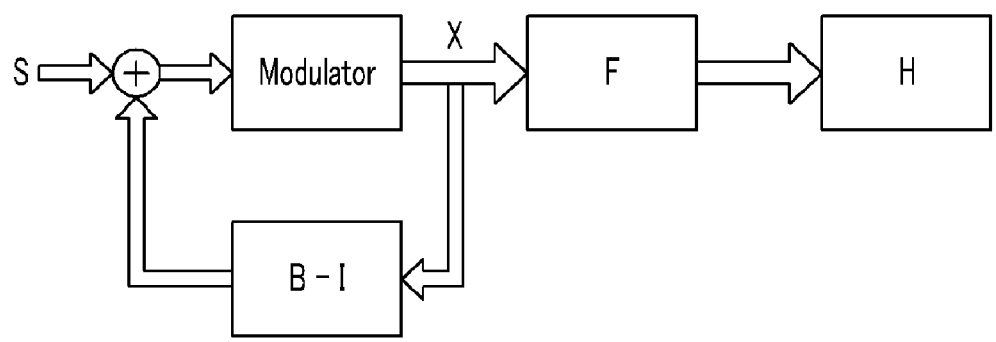
FIG. 3 is a block diagram of the base station according to an exemplary embodiment of the present invention to which Tomlison-Harashima precoding is applied.

FIG. 3 is a block diagram of the base station according to the exemplary embodiment of the present invention to which Tomlison-Harashima precoding is applied.

The channel H collected from the repeater 200 can be decomposed as the following Equation 4 by QR decomposition.

$$H = LF^H \qquad \text{[Equation 4]}$$

Herein, L indicates a lower triangular matrix and F indicates a unitary matrix. B is equal to GHF as a feedback matrix, and G is an inverse matrix of a diag(L) matrix.

The signal processor 130 of the base station 100 obtains and multiplies the F matrix at the transmitting end after generating the signals as Equation 5.

$$x_n = s_n + p_n - \sum_{j=1}^{n-1} b_{nj} x_n \qquad \text{[Equation 5]}$$

Herein, $s_n$ represents a data symbol that will be transmitted to the n-th repeater and $p_n$ represents one obtained by multiplying any integer complex by an average size of M-ary constellation. That is, $$p_n \in \{2\sqrt{M} \cdot (p_1 + j p_Q), p_1, p_Q \in Z\}.$$

In order for the base station 100 according to the exemplary embodiment of the present invention to support the spatial division multiple access, a method for determining the repeating area including the terminal 10 will be described with reference to FIG. 4.

Figure 4:
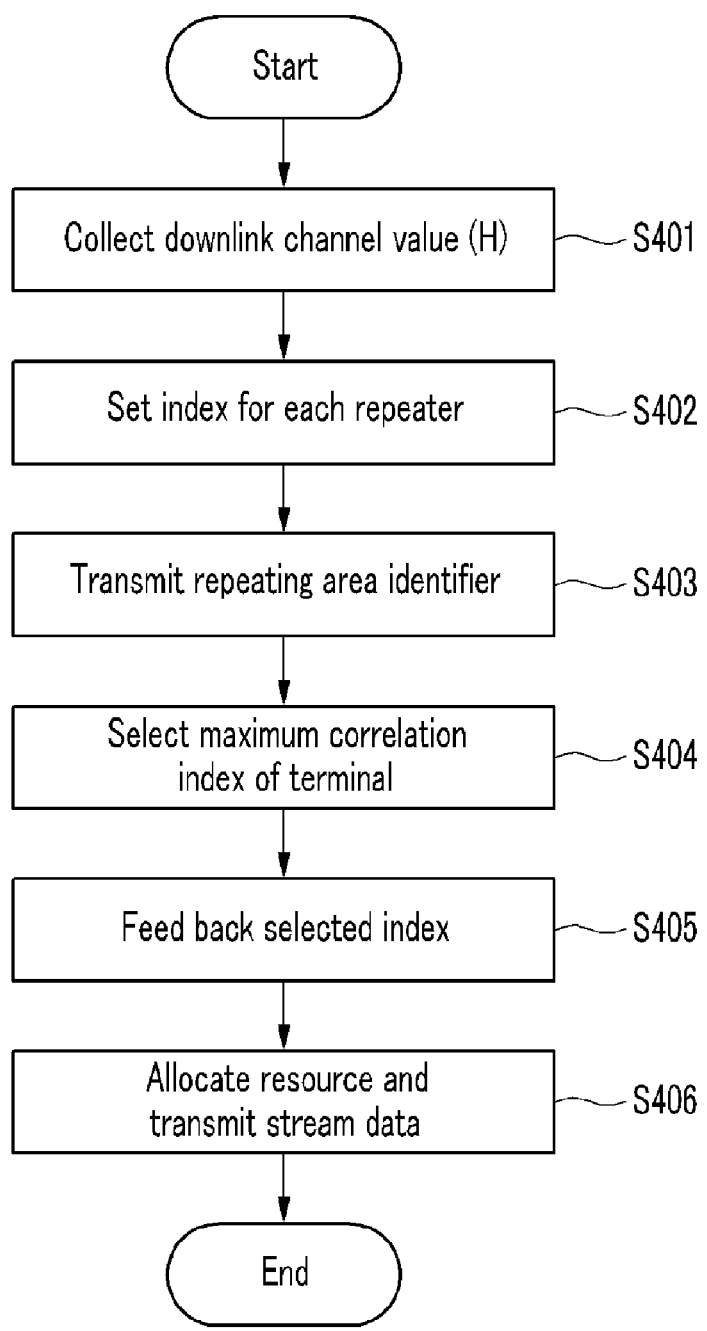
FIG. 4 is a flowchart showing a method for determining a repeating area of terminals according to an exemplary embodiment of the present invention.

FIG. 4 is a flowchart showing the method for determining the repeating area of the terminals according to the exemplary embodiment of the present invention.

Referring to FIG. 4, the channel collection unit 120 of the base station 100 according to the exemplary embodiment of the present invention collects and stores the downlink channel values (S401). At this time, the channel collection unit 120 is directly fed back with the downlink channel values from the repeaters 200 within the base station 100, or in the case of the TDD system, estimates the uplink channel based on the pilot signals from the repeater 200, thereby making it possible to acquire the downlink channel values.

The base station 100 determines the indexes of the repeaters 200, respectively, within its own area (S402), and generates and transmits the repeating area identifier information corresponding to each repeating area through the signal processing method of the first embodiment or the second embodiment (S403). At this time, the base station antenna 140 information and the index information may be included in the repeating area identifier information, and the repeater 200 amplifies the received repeating area identifier information and retransmits it to the terminal 10.

The terminal 10 detects the received repeating area identifier information, takes correlations with all identifiers, and selects the index information indicating the maximum correlation (S404). The selected index information is fed back to the base station 100 (S405).

That is, the terminal 10 of each repeating area compares the powers of the signals transmitted to each base station antenna 140 to confirm whether the terminals 10 are positioned in the repeating areas of the repeaters 200-1 to 200-N connected to what numbered transmitting antenna of the base station 100 through the transmitting antenna that transmits the signal of the largest power. Therefore, the terminal 10 selects the index information of the specific repeater transmitting the signal of the largest power to the terminal 10, making it possible to fed back the area information belonging to the terminal.

The base station 100 can determine the repeating areas (positions) of the terminal 10 based on the index information fed back from the terminal 10 and transmit the resource allocation and the corresponding stream data for the terminal 10 through the SDMA (S406).

As such, the base station 100 uses the fact that that the repeating area can be set to not be overlapped, based on the repeating area information, thereby making it possible to select the terminals 10 at each repeater 200 area one by one. The resources are appropriately allocated to the selected terminals 10, and data can be simultaneously transmitted.

As described above, the system for spatial division multiple access according to the exemplary embodiment of the present invention performs the signal processing upon transmitting the signals from the multiple antenna base stations 100 while using the existing single antenna wireless repeater 200, thereby making it possible to achieve the spatial division multiple access of the terminals 10 belonging to each repeater 200 area.

In addition, the embodiment of the present invention uses the wireless repeater 200, thereby making it possible to relatively and freely select the installation sites as compared to the existing optical repeater and obtain an economic effect by not causing additional costs such as a rental fee of an optical line.

According to the embodiments of the present invention, it is possible to perform the signal processing upon transmitting the stream signals from the multiple antenna base stations while using an existing single antenna wireless repeater as it is and allow the terminals belonging to each repeater area to selectively and strongly receive the specific stream signals of the base station, thereby making it possible to achieve the spatial division multiple access.

In addition, the wireless repeater is used, thereby making it possible to relatively and freely select the installation sites as compared to the existing optical repeater, and to obtain an economic effect by not causing additional costs such as a rental fee of an optical line.

The above-mentioned exemplary embodiments of the present invention are not embodied only by an apparatus and/or method. Alternatively, the above-mentioned exemplary embodiments may be embodied by a program performing functions that correspond to the configuration of the exemplary embodiments of the present invention, or a recording medium on which the program is recorded. These embodiments can be easily devised from the description of the above-mentioned exemplary embodiments by those skilled in the art to which the present invention pertains.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A system for spatial division multiple access, comprising:
   at least one wireless repeater group that includes at least one wireless repeater including a transmitting antenna and a receiving antenna; and
   a base station that collects downlink channel values between the wireless repeater and multiple transmitting antennas of the base station from at least one wireless repeater within an area of the base station, determines a repeating area of each terminal based on index information of a wireless repeater transmitted from the terminals for the spatial division multiple access and transmits a plurality of data stream signals to the wireless repeaters corresponding to the determined repeating areas through a multi-transmitting antenna for downlink.

2. The system for spatial division multiple access of claim 1, wherein
   the base station includes:
   a channel collection unit that collects downlink channel values between each wireless repeater and the multiple transmitting antennas of the base station; and
   a signal processor that performs the signal processing to selectively transmit each data stream corresponding to each wireless repeater, based on the downlink channel values that are collected upon simultaneously transmitting the plurality of data streams.

3. The system for spatial division multiple access of claim 2, wherein
   the channel collection unit
   acquires the downlink channel values by being periodically fed back with the downlink channel values from the wireless repeater, or
   acquires the downlink channel values by estimating uplink channels based on pilot signals received from the wireless repeater in the case of a time division duplex (TDD) system.

4. The system for spatial division multiple access of claim 2, wherein
   the signal processor
   obtains selection vectors for selecting one of the multiple antennas by performing a minimum mean square error (MMSE) method or a zero forcing (ZF) method on the downlink channel values.

5. The system for spatial division multiple access of claim 2, wherein
   the signal processor
   obtains the selection vectors for selecting one of the multiple antennas by performing a precoding method on the downlink channel values.

6. A system for spatial division multiple access comprising:
   a base station that selectively transmits a plurality of data stream signals through multiple transmitting antennas for downlink; and
   at least one wireless repeater that have a transmitting antenna and a receiving antenna and forms a wireless repeater group within the base station area and repeats the data stream signals selectively transmitted from the base station to terminals,
   wherein
   the base station includes:
   a channel collection unit that collects downlink channel values between each wireless repeater and the multiple transmitting antennas of the base station; and
   a signal processor that performs the signal processing to selectively transmit each data stream corresponding to each wireless repeater, based on the downlink channel values that are collected upon simultaneously transmitting the plurality of data streams,
   wherein
   the signal processor
   obtains selection vectors for selecting one of the multiple antennas by performing a minimum mean square error (MMSE) method or a zero forcing (ZF) method on the downlink channel values; and
   sums vectors obtained by multiplying the selection vectors by the plurality of data stream signals, respectively, at the front ends of the multiple antennas, and transmits them.

7. The system for spatial division multiple access of claim 6, wherein
   the signal processor
   down-transmits identifier information corresponding to the repeating areas of each wireless repeater to the terminal and is fed back with the index information of the wireless repeaters selected from the terminal to determine the repeating areas (positions) of the terminals.

8. A method for performing spatial division multiple access by allowing a base station to use a wireless repeater having a single transmitting/receiving antenna, comprising:
   collecting downlink channel values between the wireless repeater and multiple transmitting antennas of the base station from at least one wireless repeater within the area of the base station;
   determining a repeating area of each terminal based on index information of a wireless repeater transmitted from the terminals for the spatial division multiple access; and
   transmitting a plurality of data stream signals to the wireless repeaters corresponding to the determined repeating areas through a multi-transmitting antenna for downlink.

9. The method for spatial division multiple access of claim 8, wherein
   the collecting downlink channel values includes acquiring the downlink channel values by estimating uplink channels based on pilot signals received from the wireless repeater in the case of a time division duplex (TDD) system.

10. A method for performing spatial division multiple access by allowing a base station to use a wireless repeater having a single transmitting/receiving antenna, comprising:
   collecting downlink channel values between the wireless repeater and multiple transmitting antennas of the base station from at least one wireless repeater within the area of the base station;

determining a repeating area included in terminals for the spatial division multiple access; and selectively transmitting a plurality of data stream signals to the wireless repeater through a multi-transmitting for downlink, the determining a repeating area includes:

defining the index information of the wireless repeaters;

transmitting the repeating area identifier information to each repeating area by performing the signal processing on the downlink channel values; and determining the repeating areas of the terminals based on first index information fed back from the terminal, wherein the first index information is information that detects and selects the repeating area identifier information by the terminal.

11. A method for performing spatial division multiple access by allowing a base station to use a wireless repeater having a single transmitting/receiving antenna, comprising:

collecting downlink channel values between the wireless repeater and multiple transmitting antennas of the base station from at least one wireless repeater within the area of the base station;

determining a repeating area included in terminals for the spatial division multiple access; and selectively transmitting a plurality of data stream signals to the wireless repeater through a multi-transmitting antenna for downlink, the selectively transmitting includes obtaining selection vectors for selecting one of the multiple antennas, and summing vectors obtained by multiplying the selected vectors by the generated stream signals at the front ends of the multiple antennas, respectively, and transmitting them.

12. The method for spatial division multiple access of claim 11, wherein the obtaining of the selected vectors performs at least one of a minimum mean square error (MMSE) method, a zero forcing (ZF) method, and a precoding method on the downlink channel values.

* * * * *